United States Patent [19]
Rowan

[11] 3,775,865
[45] Dec. 4, 1973

[54] SIMULATOR FOR TEACHING SUTURING TECHNIQUES

[76] Inventor: Robert L. Rowan, 34 E. 67th St., New York, N.Y. 10021

[22] Filed: July 24, 1972

[21] Appl. No.: 274,169

[52] U.S. Cl. .................................................. 35/17
[51] Int. Cl. ....................................... G09b 23/28
[58] Field of Search ........................................ 35/17

[56] References Cited
UNITED STATES PATENTS

| | | | |
|---|---|---|---|
| 2,678,505 | 5/1954 | Munson | 35/17 |
| 2,704,897 | 3/1955 | Lade | 35/17 |
| 2,871,579 | 2/1959 | Niiranen et al. | 35/17 |

Primary Examiner—Harland S. Skogquist
Attorney—Arthur O. Klein

[57] ABSTRACT

A method and an arrangement for teaching suturing techniques in surgery. A tube of plastic material is adjustably mounted on a surface by means of two clamps, the positions of which are adjustable as well as their spring tensions. A portion of the tubular wall has been cut or removed. This plastic tube simulates various tissues of the human body. A cylinder having a pair of confronting cut-outs is placed on the supporting surface on top of the tube, this cylinder simulates a body cavity of the human body in which a surgical operation is to be carried out. The separated tubular walls of the plastic tube can be sewn together by means of known suturing tools and techniques thereby simulating a natural surgical operation and teaching various suturing techniques.

6 Claims, 4 Drawing Figures

SIMULATOR FOR TEACHING SUTURING TECHNIQUES

The subject matter of the invention relates to a simulator for practicing the art of suturing on the skin or inside the body cavity of a patient. The arrangement of the invention makes it possible to teach various suturing techniques without requiring the medical student to actually perform the suturing on the human patient in order to obtain the necessary experience to become a competent surgeon.

It is therefore an object of this invention to provide a simulator for enabling medical students to practice the art of suturing on the surface or within the human body without actually requiring a medical student to participate in an operation on the human body.

The arrangement of the invention comprises a piece of rubber tubing of approximately 3 inches in length. The rubber tubing is cut open longitudinally along its entire length. A part of the tubular wall is preferably removed so that a cross-section of the remainder of the rubber tubing has the shape of the letter C.

The thus cut rubber tubing is mounted on a surface between a pair of biased clamps having adjustable biasing means. The clamps are adjustably mounted on the surface. Due to the adjustable positioning and holding forces of the clamps, the proper tension to be applied by the medical student can be taught. Thus, if the medical student pulls upwardly after performing a stitch during suturing or tying the stitches and the force applied by the medical student is too large, the rubber tubing will slip out of the clamp and thus simulate the "pulling out" which occurs sometimes during a surgical operation.

A large cylinder having confronting cut-outs may be placed over the rubber tubing mounted as herein above described. The suturing by the medical student is then carried out within the space defined by the large cylinder. This large cylinder simulates the various depths and diameters of body cavities as well as the narrow spaces in which sometimes a surgical operation must be carried out in the human body.

BRIEF DESCRIPTION OF DRAWING

The invention is illustrated by way of example in the accompanying drawing which forms part of this application and in which.

DESCRIPTION OF PREFERRED EMBODIMENT

Figure 1:
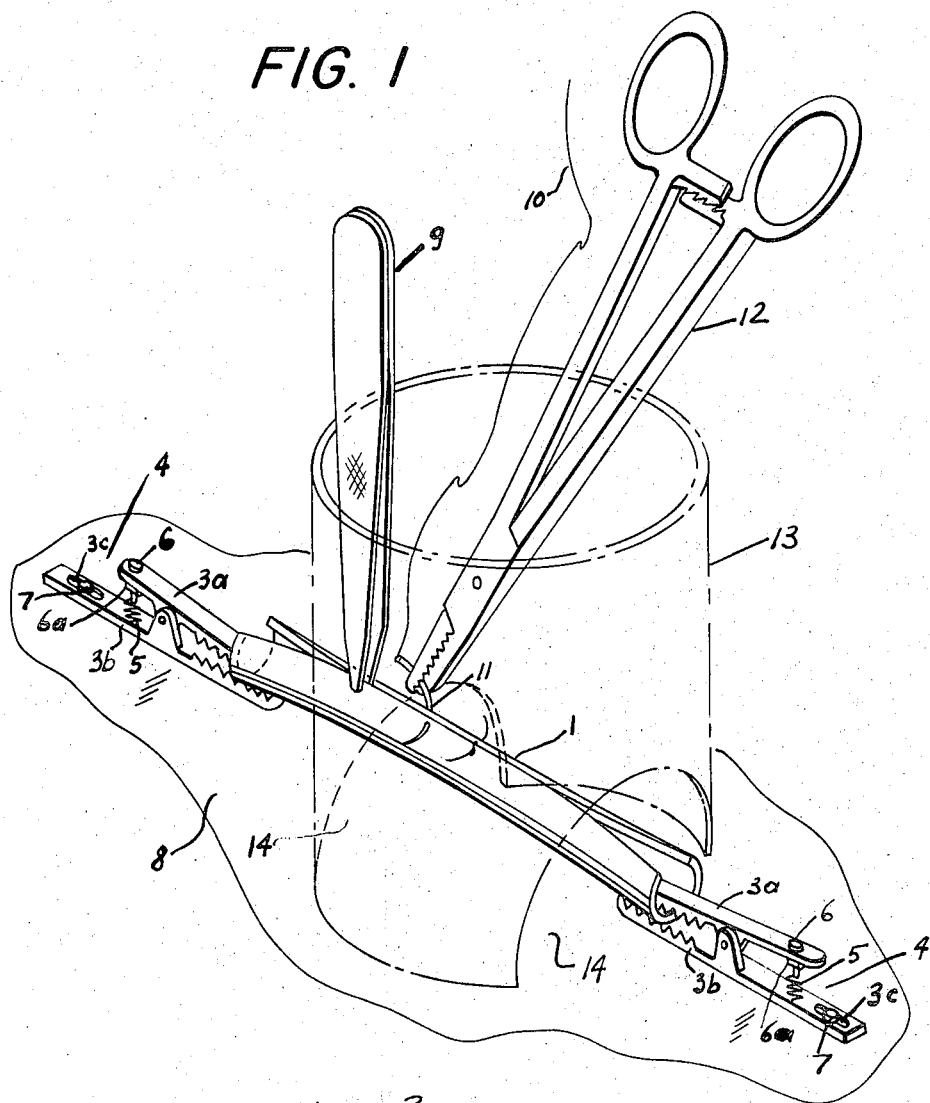
FIG. 1 is a schematic view in perspective of an arrangement in accordance with this invention.
Figure 2:
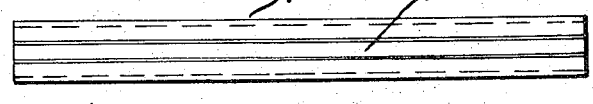
FIG. 2 is a plan view of a rubber tubing forming part of the arrangement of the invention.

Referring now to the drawing, there is illustrated a tube 1 which has been cut along its entire length. A part of the wall of the tube has been removed so as to create a longitudinal gap 2 in the tube. The tube is about three inches in length but can be of any desired length. The diameter is approximately one-half inch but can also be of any desired dimension. The material of which the tube is made can be silicone (silastic rubber), latex, natural rubber, polyurethane plastics, woven fibers of cotton, silk or other materials. The materials and the dimensions, such as thickness, diameter and distance between edges, must be selected and matched to the tensile strength and consistency of the various body tissues that are to be simulated. Thus, for example, if the human skin is to be simulated a strong material must be selected, while a simulation of the kidney or the eye would require the selection of a very delicate material.

The tubing 1 mounted between the jaws 3a, 3b of a pair of opposed clamps 4. The pairs of opposed clamps 4 have springs 5, the tensional and compression forces of which can be adjusted by means of screws 6 threadably mounted in studs 6a which are integral with the upper jaws 3a. Thus, the holding force of the clamps 4 can be adjusted by means of the screws or threaded bolts 6 and the springs 5. The lower jaw 3b of each clamp 4 has a longitudinal slot 3c at the rear end thereof. A threaded bolt or screw 7 secures the clamp 4 to any suitable surface such as a plastic board 8 since the threaded bolt 7 is movable in the longitudinal slot 3c, the respective positions of the clamps 4 can be adjusted on the board 8.

Thus, during the simulation of suturing techniques, the tubing 1 is held in place by the pairs of clamps 4, the clamping forces of which have been previously adjusted so as to simulate the consistency and strength of a preselected tissue material. The walls of the tubing 1 are then held together by forceps 9 and the suturing thread 10 is then introduced via a needle 11 into the rubber tubing 1 by a pair of suturing scissors 12 which clampingly hold the needle 11.

After the medical student or surgeon has mastered the art of suturing to a certain degree, a cylinder 13 having a pair of opposed cut-outs 14 is placed on the tubing as shown in FIG. 1. The cylinder 13 is of large diameter and simulates a body cavity of the human body. The suturing is now carried out inside of this cylinder 13 thereby making the suturing more difficult.

In this manner a high degree of skill in suturing techniques can be attained.

Figure 3:
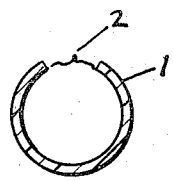
FIG. 3 is a cross-sectional view along line 3—3 of FIG. 2.
Figure 4:
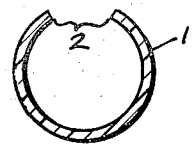
FIG. 4 is a cross-sectional view of a different type of rubber tubing.

The tubing 1 can either be replaced by a tubing of a different size as for example illustrated in FIGS. 3 and 4. The tubings 1 can be color coded to represent different body tissues. Furthermore, the tubings 1 can be disposable and can be packaged in kits.

The entire arrangement can be sold as a training unit package for surgical residents or medical students. Refills can be sold separately in different sizes, different thicknesses and different consistencies. Each tubing can offer the student a different degree of surgical "feel."

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A simulator for teaching suturing techniques, comprising in combination, a support surface, a pair of biased clamping means adjustably mounted on said support surface, a piece of tubing clampingly held by said pair of clamping means, said tubing having a longitudinal slit along its entire length.

2. The simulator as set forth in claim 1, wherein each one of said clamping means comprises a pair of opposite jaws pivotally mounted with respect to each other and a coil spring disposed within said pair of jaws.

3. A simulator as set forth in claim 2, including a bolt threadably mounted in one of said pair of jaws and operatively connected to said coil spring for adjusting the force applied by said coil spring to said pair of jaws.

4. A simulator as set forth in claim 3, wherein the other one of said jaws comprises a longitudinal slit, a third bolt mounted in said slit and connecting said other one jaw to said supporting surface.

5. The simulator as set forth in claim 1, including a cylinder having confronting cut-outs on said supporting surface over said rubber tubing.

6. The simulator as set forth in claim 1, wherein said rubber tubing is made of material selected from the group of silicone, latex, natural rubber, polyurethane plastic, woven fibers of cotton, and silk.

* * * * *